United States Patent
Azam et al.

(10) Patent No.: US 12,033,555 B2
(45) Date of Patent: Jul. 9, 2024

(54) WIRELESS CONFIGURATION OF DISPLAY ATTRIBUTE

(71) Applicant: Hewlett-Packard Development Company, L.P., Spring, TX (US)

(72) Inventors: Syed S. Azam, Spring, TX (US); Anthony Kaplanis, Spring, TX (US); Alexander Williams, Spring, TX (US); Gregory Staten, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 201 days.

(21) Appl. No.: 17/418,807

(22) PCT Filed: Apr. 29, 2019

(86) PCT No.: PCT/US2019/029586
§ 371 (c)(1),
(2) Date: Jun. 26, 2021

(87) PCT Pub. No.: WO2020/222731
PCT Pub. Date: Nov. 5, 2020

(65) Prior Publication Data
US 2022/0068185 A1    Mar. 3, 2022

(51) Int. Cl.
*G09G 3/20* (2006.01)
*G06F 3/14* (2006.01)
*G08C 17/02* (2006.01)
*H04Q 9/00* (2006.01)
*H04W 4/80* (2018.01)

(52) U.S. Cl.
CPC ......... *G09G 3/2003* (2013.01); *G06F 3/1423* (2013.01); *G08C 17/02* (2013.01); *H04Q 9/00* (2013.01); *H04W 4/80* (2018.02); *G08C 2201/30* (2013.01); *G09G 2320/0666* (2013.01); *G09G 2320/0693* (2013.01); *G09G 2340/0492* (2013.01); *G09G 2356/00* (2013.01); *G09G 2360/04* (2013.01); *G09G 2370/16* (2013.01)

(58) Field of Classification Search
CPC .. G09G 3/20; H04Q 9/00; H04W 4/80; G08C 17/02; G06F 3/14; G06F 3/1423
See application file for complete search history.

(56) References Cited

U.S. PATENT DOCUMENTS 9,235,373 B2    1/2016    Toren et al.
9,600,220 B2    3/2017    Drake et al.
(Continued)

FOREIGN PATENT DOCUMENTS

CN    101149673 A    3/2008
CN    108287675 A    7/2018
(Continued)

*Primary Examiner* — Todd Buttram
(74) *Attorney, Agent, or Firm* — Quarles & Brady LLP

(57) ABSTRACT

In an example implementation according to aspects of the present disclosure, a system includes a display, a processor and a wireless sensor. The processor receives remote wireless signals from the wireless sensor corresponding to another display. The processor determines a physical locational relationship and orientation in three-dimensional space based on the received signal. The processor logical represents the relationship and orientation in a configuration screen and sets attributes of the display based on the representation.

15 Claims, 8 Drawing Sheets

(56) References Cited

U.S. PATENT DOCUMENTS

| | | | |
|---|---|---|---|
| 9,710,217 B2 | 7/2017 | DeLuca et al. | |
| 9,880,799 B1 | 1/2018 | Bertz et al. | |
| 9,998,847 B2 * | 6/2018 | Norris | H04S 1/007 |
| 2004/0263424 A1 | 12/2004 | Okuley | |
| 2009/0167782 A1 | 7/2009 | Petljanski et al. | |
| 2011/0047489 A1 | 2/2011 | Orr et al. | |
| 2011/0157327 A1 * | 6/2011 | Seshadri | H04N 21/235 |
| | | | 348/51 |
| 2014/0002327 A1 | 1/2014 | Toren et al. | |
| 2015/0145883 A1 * | 5/2015 | Marti | G06T 11/001 |
| | | | 345/592 |
| 2015/0161937 A1 | 6/2015 | Locker et al. | |
| 2015/0243251 A1 | 8/2015 | Ohnishi | |
| 2016/0035312 A1 | 2/2016 | Lee et al. | |
| 2017/0155871 A1 | 6/2017 | Rakshit | |
| 2018/0181252 A1 | 6/2018 | Park et al. | |
| 2019/0014205 A1 * | 1/2019 | Miloseski | H04M 1/72451 |
| 2022/0068185 A1 * | 3/2022 | Azam | G09G 3/2003 |

FOREIGN PATENT DOCUMENTS

| | | | | |
|---|---|---|---|---|
| WO | WO-WO2013162564 A1 | | 10/2013 | |
| WO | WO-WO2014120144 A1 | | 8/2014 | |
| WO | WO-2020222731 A1 * | | 11/2020 | G06F 3/1423 |

* cited by examiner

WIRELESS CONFIGURATION OF DISPLAY ATTRIBUTE

BACKGROUND

Display systems present images for users to more effectively process information. Utilizing more than one display panel in a display system allows a user to view more information at any given time.

DETAILED DESCRIPTION

In multi-display computing systems, users configure the logical configuration of the displays in a configuration screen to properly display their workspace. The configuration may be clumsy and inaccurate resulting in the misconfiguration of the workspace, where the movement of the mouse across displays is awkward or incorrect. Additionally, the location and display of application windowing may be distorted and non-uniform. As described herein, is a system, method and computer readable media for the receiving of wireless signals from display systems, the determination of location within a three-dimensional space, and the configuration of display attributes based on the determination within the multi display system.

Figure 1:
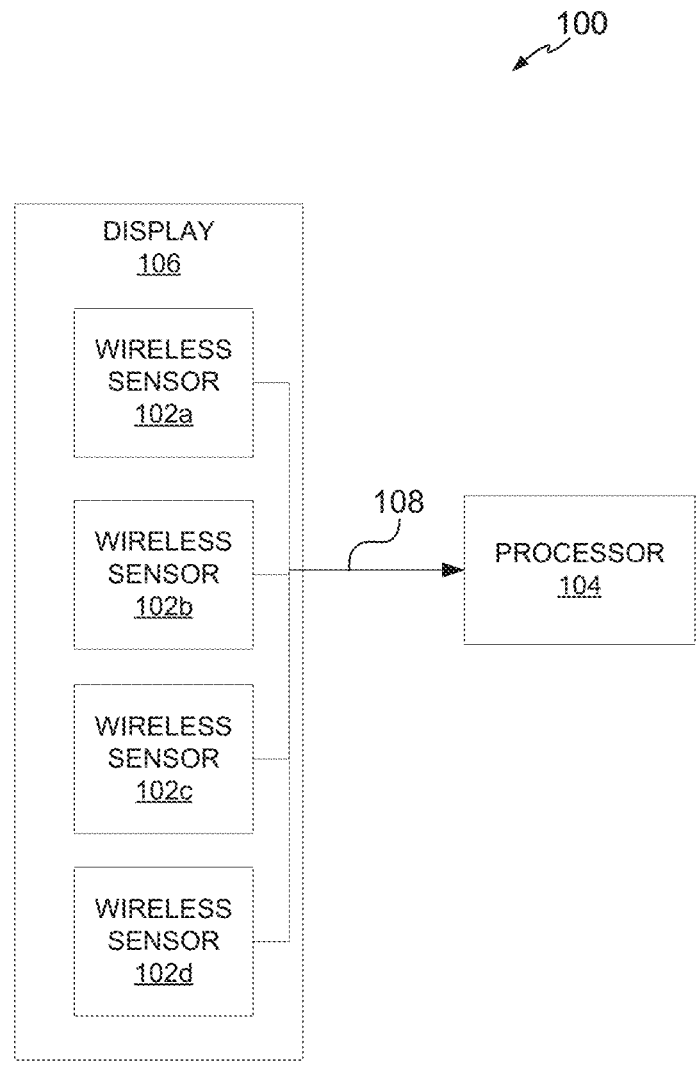
FIG. 1 is a block diagram of a system for the wireless configuration of a display attribute, according to an example.

FIG. 1 is a block diagram of a system 100 for the wireless configuration of a display attribute, according to an example.

The system 100 may include a processor 104. The processor 104 may include but is not limited to embedded scalar processors utilized in displays or central processing units (CPUs) utilized in personal computers. The system 100 may include support systems (not shown) to assist the operation of the processor 104 including buses, power delivery subsystems, non-volatile memory, as well as other electrical communication pathways. The processor 104 may be configured to receive signals from other subcomponents of the display including device information and/or identifiers such as an extended display identification data (EDID) correlating to information relating to the display panel utilized in the display 106.

The processor 104 may be communicatively coupled with a set of wireless sensors 102a, 102b, 102c, 102d. The wireless sensors 102a, 102b, 102c, 102d may be transceivers, in that they can both send and receive wireless signals in a single active unit. In another implementation the wireless sensors 102a, 102b, 102c, 102d may be receivers capable of receiving a signal from an exterior source in a passive unit. The wireless sensors 102a, 102b, 102c, 102d may include but not be limited to radio frequency identification (RFID) tags and near field communication (NFC) transceivers. The wireless sensors 102a, 102b, 102c, 102d may disposed at positions around the periphery of the display 106, corresponding to an edge of the display 106. In one implementation, the wireless sensors 102a, 102b, 102c, 102d may be disposed at the corners of a rectangular display 106. In other implementations, more or less wireless sensors may be disposed at various places within the display 106.

The display 106 provides visual output from the system 100. The display 106 may utilize any number of visual display technologies including but not limited to cathode ray tubes, liquid crystal displays, and light emitting diodes. The display 106 may be implemented as a non-planar imaging device such as a curved or foldable display capable of traversing different three-dimensional planes. The display 106 may include a set of attributes. The set of attributes may correspond to display functionalities or characteristics of the display 106. The set of attributes may include display size, display resolution, display density, display color gamut, color calibration and display lighting. In some implementations, the set of attributes may correspond to all or a portion of the EDID information. The set of attributes may be adjustable by the processor 104. For example, the resolution of the display 106 may be altered based on a signal sent from the processor to the display. In another implementation, the processor 104 may adjust the display lighting for low light or nighttime viewing. Default configuration of the set of attributes may vary from display panel manufacturers and may not be consistent within panels from different manufacturers within a multi-display system.

A communication channel 108 may be utilized to transmit and receive data from the wireless sensors 102a, 102b, 102c, 102d by the processor 104. The communication channel 108 may be a bus implemented internally between the wireless sensors 102a, 102b, 102c, 102d and the processor 104 in one implementation. In another implementation, the communication channel 108 may take the form of a cable compliant with a communication protocol such as universal serial bus or DisplayPort. The communication channel 108 provides the infrastructure for the wireless sensors 102a, 102b, 102c, 102d to relay information as detected to the processor 104 for further interpretation.

Figure 2A:
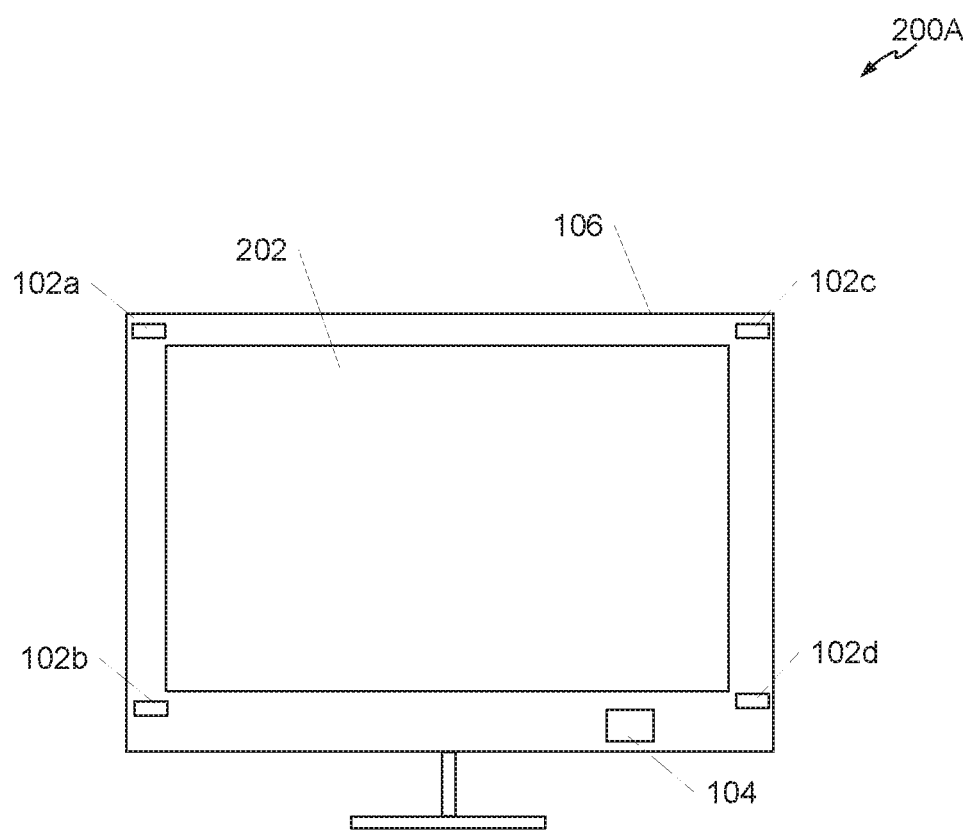
FIGS. 2A and 2B are illustrations of systems for the wireless configuration of a display attributes, according to examples.
Figure 2B:
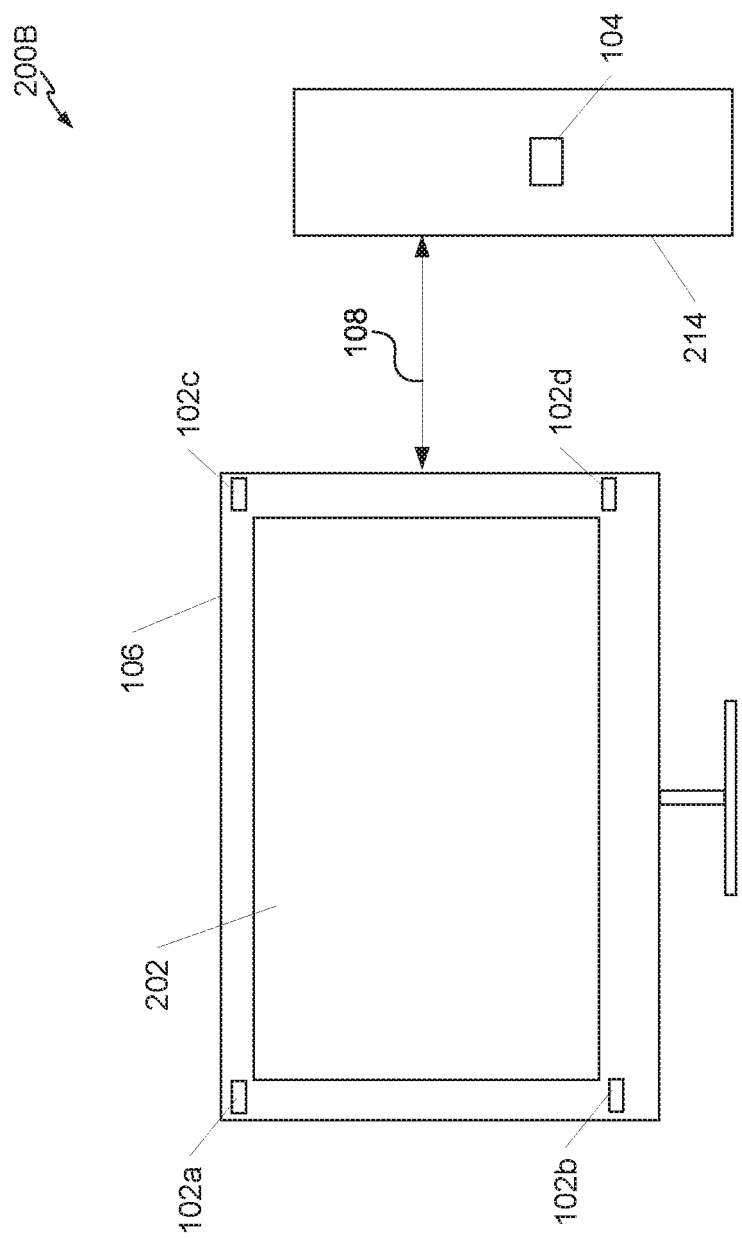

FIGS. 2A and 2B are illustrations of systems for the wireless configuration of a display attributes, according to examples.

FIG. 2A is an illustration 200A of integrated system for the wireless configuration of display attributes. As described above the display 106 as illustrated in FIG. 2A, may include wireless sensors 102a, 102b, 102c, 102d, a processor 104 and a display panel 202. In this implementation, the processor 104 may be an embedded integrated circuit for controlling the display panel 202. A delta distance value 216 between the display 106 and the secondary display 206 may be interpreted when the processor 104 determines a physical locational relationship as described later.

FIG. 2B is an illustration 200B of another implementation of a system for the wireless configuration of display attributes. Similar in organization as the integrated system as described in reference to FIG. 2A, this implementation may include the wireless sensors 102a, 102b, 102c, 102d and the display panel 202. However, the processor 104 may be disposed externally from the display 106. In this implementation, the processor 14 may exist with a computer 214 and take the form of a CPU. The computer 214 may connected to the display 106 through a communication channel 108. In one implementation the communication channel 108 may include but is not limited to DisplayPort or USB.

Figure 3A:
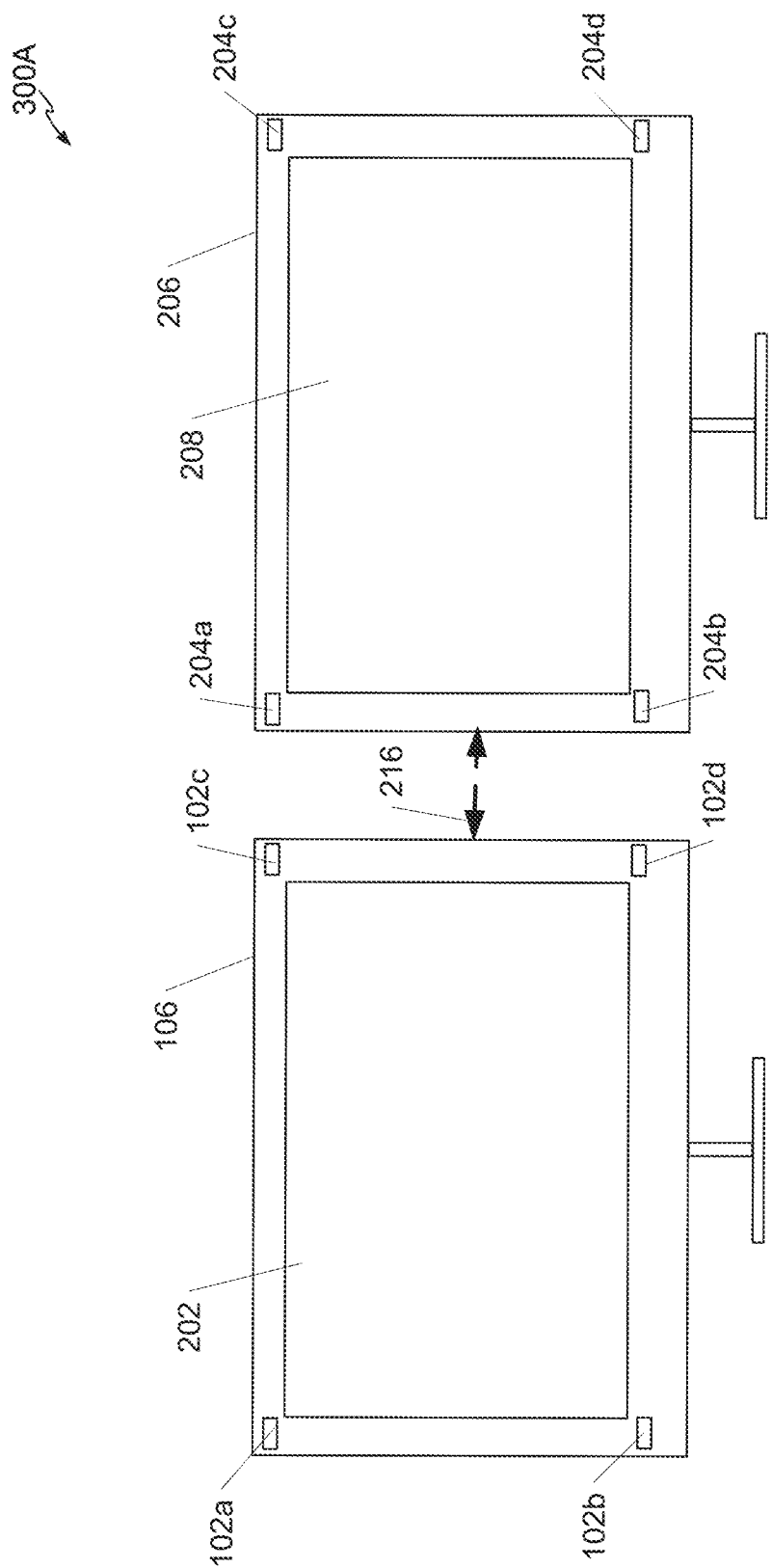
FIGS. 3A, 3B, and 3C are illustrations of systems for the wireless configuration of display attributes in multi display configurations, according to another example of the present disclosure.
Figure 3B:
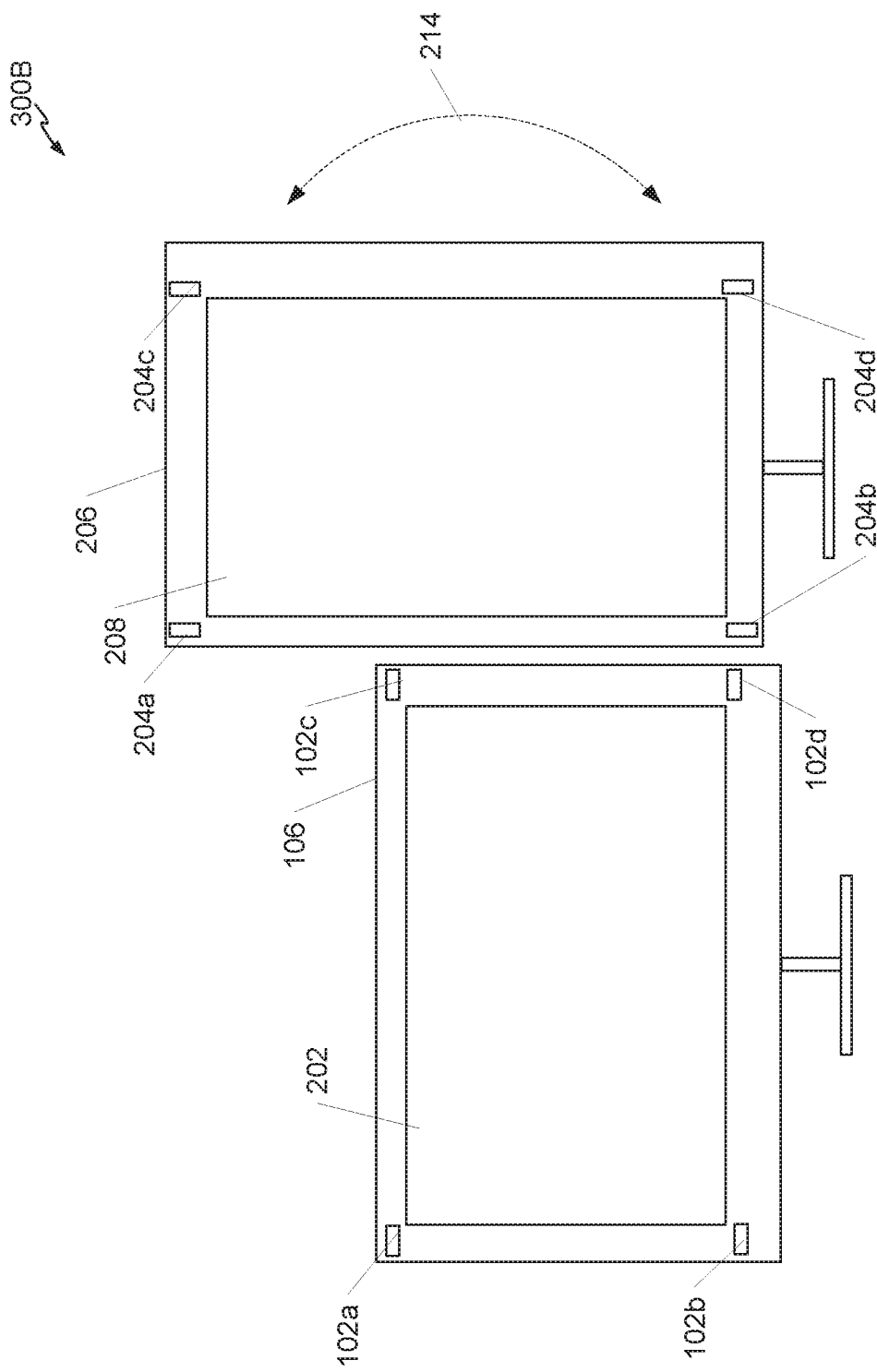
Figure 3C:
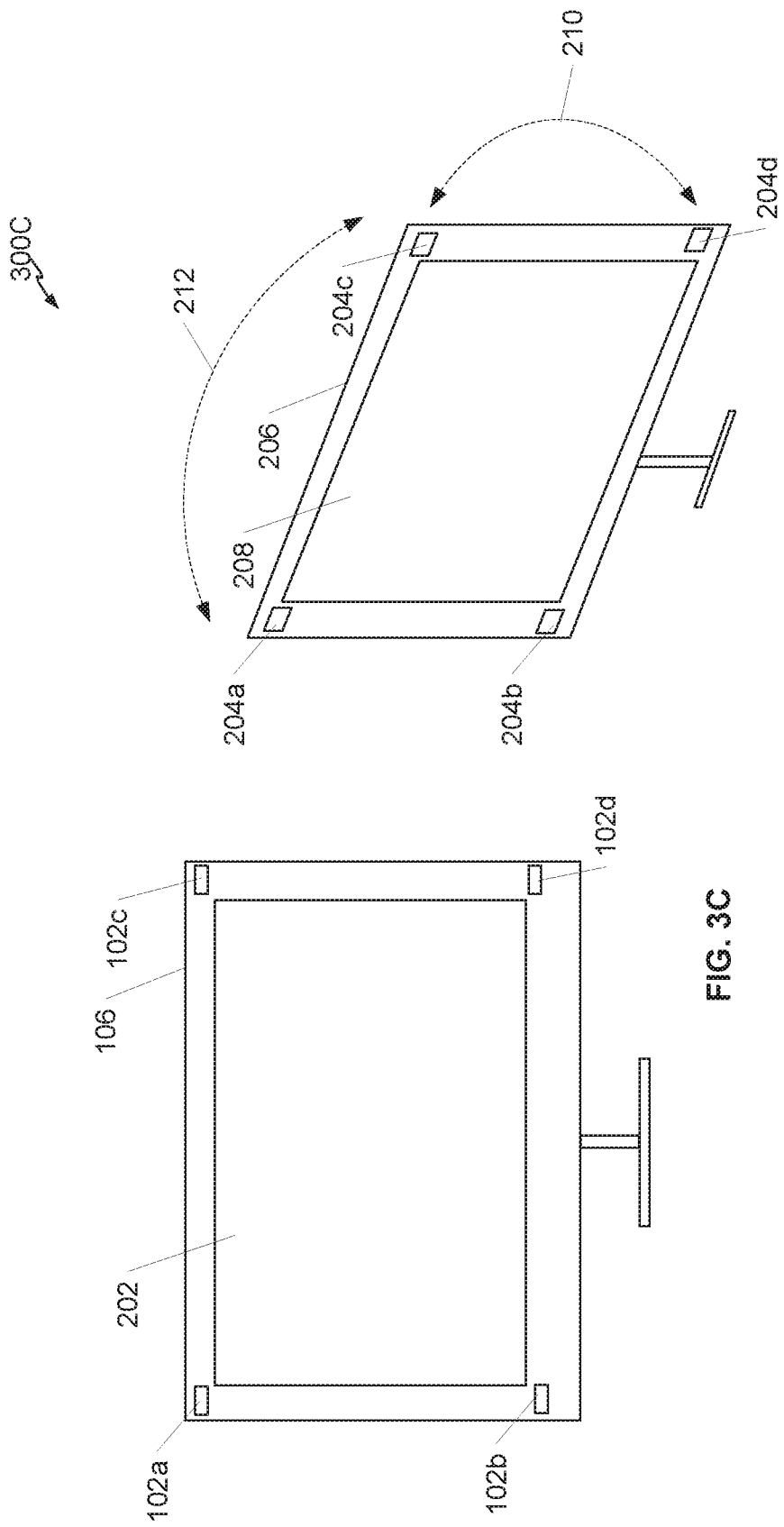

FIGS. 3A, 3B, and 3C are illustrations of systems for the wireless configuration of display attributes in multi display configurations, according to another example of the present disclosure.

FIG. 3A is an illustration 300A of a system for the wireless configuration of display attributes in an extended desktop configuration. In this example, the display 106 may take a role of a primary display. Additionally, a secondary display 206 may provide additional display area for a multi-display system. The secondary display 206 may be comparably equipped with a secondary display panel 208, and secondary wireless sensors 204a, 204b, 204c, 204d. The interaction between the wireless sensors 102a, 102b, 102c, 102d and the secondary wireless sensors 204a, 204b, 204c, 204d may allow for the processor 104 (not shown in FIG. 2A) to interpret a display location relationship and orientation. The interaction of the wireless sensors 102a, 102b, 102c, 102d and the secondary wireless sensors 204a, 204b, 204c, 204d is described in detail later in this disclosure.

FIG. 3B is an illustration 300B of a system for the wireless configuration of display attributes with a change in orientation between the display 106 and the secondary display 206. As illustrated, the positioning of the secondary wireless sensors 204a, 204b, 204c, 204d extends in a non-symmetrical configuration in relation to the wireless sensors 104a, 104b, 104c, 104d. The orientation may include a delta turn value 214, wherein the delta turn value corresponds to a difference off the horizontal plane or off the vertical plane where the wireless sensor 102a, 102b, 102c, 102d, or a secondary wireless sensor 202a, 202b, 202c, 202d resides in reference to their respective displays as reference points. As illustrated here, the delta turn value 214 of the secondary display 206 is co-planar.

FIG. 3C is an illustration 300C of a system for the wireless configuration of a display attributes with non-coplanar displays. In this example, the display 106 and the secondary display 206 may be oriented in different planes within a three-dimensional space. Additionally, the secondary display 206 may be configured to non-coplanar delta turn 212 or a delta tilt 210, thereby placing the secondary sensors 204a, 204b, 204c, 204d in a different alignment relationship with the display 106 and the wireless sensors 102a, 102b, 102c, 102d. The non-coplanar delta turn 212 may be a turn of the secondary display 206 where the display doesn't exist in the same plane as the display 106 as a reference point. The delta tilt 210 may be a pivot of the secondary display 206 on a mount, positioning the secondary wireless sensors 202a, 202b, 202c, 202d outside of a horizontal plane or vertical plane. The delta tilt 210 may be in reference to another display in the system.

Figure 4:
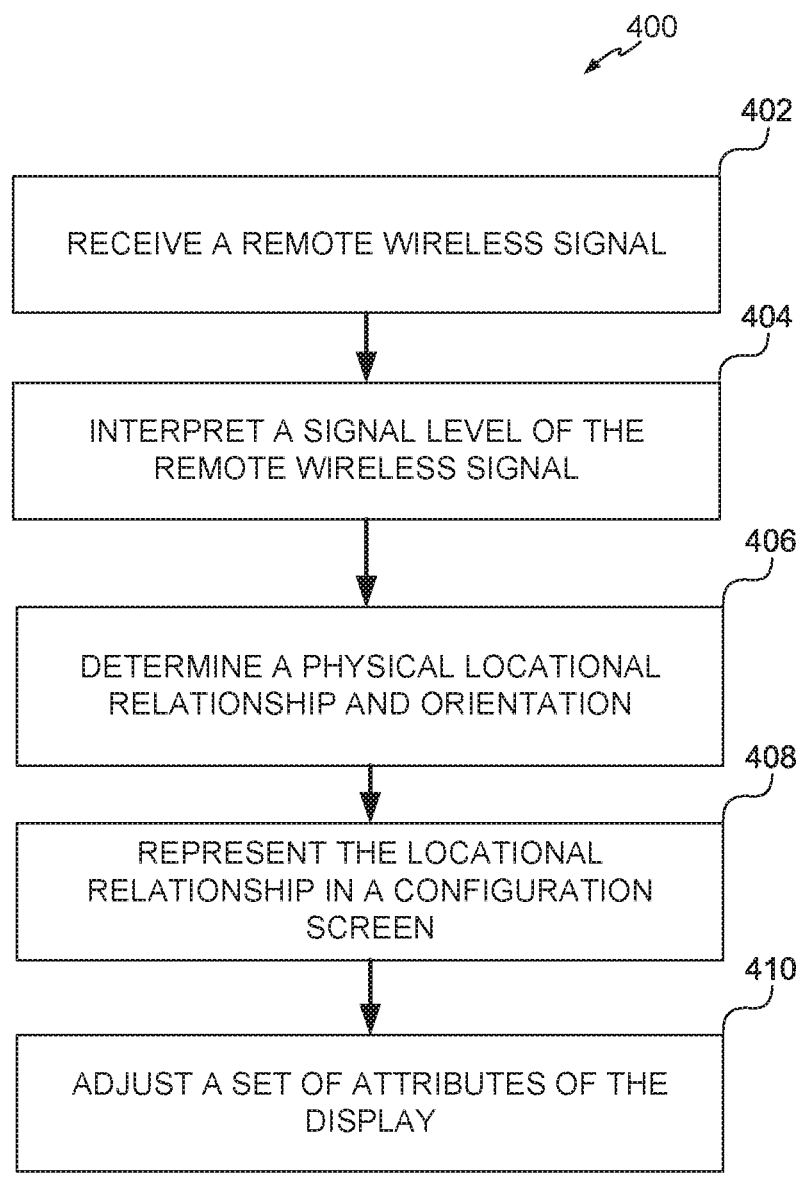
FIG. 4 is a flow diagram illustrating a method for the wireless configuration of a display attributed, according to an example.

FIG. 4 is a flow diagram 400 illustrating a method for the wireless configuration of a display attributed, according to an example.

At step 402, the processor 104 receives a remote wireless signal at a wireless sensor 102a, 102b, 102c, 102d. In one implementation the remote wireless signal is transmitted from a secondary display 206. The wireless sensors 102a, 102b, 102c, 102d may receive a signal from a signal emitter or secondary wireless sensors 202a, 202b, 202c, 202d associated with the secondary display 206. The remote wireless signal may include information identifying the transmitter or wireless sensor from which the remote wireless signal was transmitted. The identifying information may include a unique identifier (uid) or a universally unique identifier (uuid) associated with the signal emitter or the secondary wireless sensor 202a, 202b, 202c, 202d.

At step 404, the processor 104 interprets a signal level of the remote wireless signal. The processor 104 may utilize received signal strength indicators (RSSI) for detecting the signal level of the remote wireless signal. In another implementation, received channel power indicator (RCPI) may be used to determine the signal level. Signal levels received at each of the wireless sensors 102a, 102b, 102c, 102d may be captured from each of the transmitters. Referring back to FIG. 3C, a signal transmitted from secondary wireless sensor 204a, may be received at all the wireless sensors 102a, 102b, 102c, 102d. Each of the wireless sensors 102a, 102b, 102c, 102d would interpret a signal level of that received remote wireless signal.

At step 406, the processor 104 determines a physical locational relationship and orientation. The processor 104 may have information relating to the location of the wireless sensors 102a, 102b, 102c, 102d in relation to the display 106 stored in the set of attributes. The processor 104 may determine a physical locational relationship and orientation based on the signal levels received at the wireless sensors 102a, 102b, 102c, 102d. The processor 104, in conjunction with the set of attributes, particularly screen display size and location of the wireless sensors 102a, 102b, 102c, 102d, may triangulate the distance of the transmitter from the sensor. Referring back to FIG. 3C again, the signal received at wireless sensors 102a, 102b, 102c, 102d each would have a separate signal strength measurement from the received remote wireless signal from secondary wireless sensor 204a. Based on the dimensions of the display 106 included in the set of attributes as well as the interpreted signal strengths recorded at each wireless sensor 102a, 102b, 102c, 102d, the processor 104 can locate a point in three-dimensional space where the received remote wireless signal was transmitted through triangulation. Utilizing remote signal interpretation for all transmitters (secondary wireless sensors 202a, 202b, 202c, 202d) received at each of the wireless sensors 102a, 102b, 102c, 102d, provides the processor 104 with enough information to identify the location of all of the secondary wireless sensors 202a, 202b, 202c, 202d in three-dimensional space and therefore, the secondary display 206.

At step 408, the processor 104 represents the locational relationship in a configuration screen. Upon the determining of a physical locational relationship between the display 106 and the secondary display 106, the processor 104 may display a rendered image of the arrangement of the display and secondary display. In one implementation, the representation may be similar to that as a configuration screen in an operating system. The representation may be a three-dimensional representation to show not only location, but any detected orientation and/or tilt of a display 106 or secondary display 206. The representation recreates the delta distance value 216, the non-coplanar delta turn value 212, the coplanar delta turn value 214, and the delta tilt value 210 to full represent the configuration within the configuration screen.

At step 410, the processor adjusts a set of attributes of the display. The processor 104 may adjust the set of the attributes of the display to correspond to the location of the detected display. For example, the processor 104 may inform an operating system through a communication channel (see FIG. 2B), of the locational relationship of the secondary display 206. Based on the locational relationship, and any additional information the operating system has received from the secondary display 206 (e.g. EDID), the processor 104 may set resolution boundaries for the workspaces. For example, referring to back to FIG. 3B, the set of attributes corresponding to resolution, which would be different for the display 106 and secondary display 206, may be adjusted to create a virtual boundary between a desktop rendering on the display 106 and the secondary display 206. Additionally, based on the set of attributes from the secondary display 206, the processor 104 may adapt display properties to the display 106. For example, a backlight setting on display 106 may be adjusted to match that of detected secondary display 206 when the locational relationship is side by side with little room between the bezels. In this example, matching backlight levels may be desirable due to the proximity of the display 106 and the secondary display 206.

In another example, the display 106 may have a wider or different color gamut than the secondary display 206. The processor 104 may adjust the set of attributes including color gamut of the display 106 based on the set of attributes from the secondary display 206.

Figure 5:
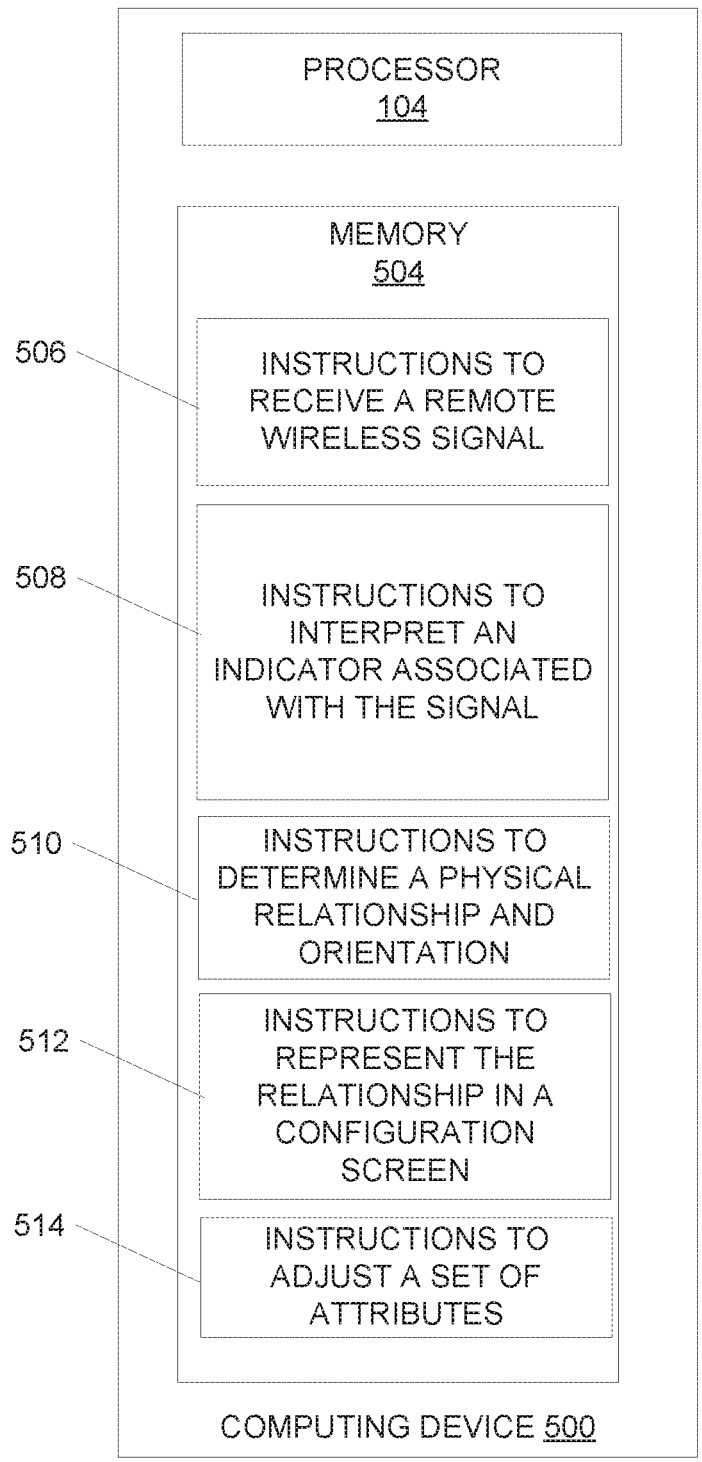
FIG. 5 is a computing device for supporting wireless configuration of display attributes, according to an example.

FIG. 5 is a computing device 500 for supporting wireless configuration of display attributes, according to an example. The computing device 500 depicts a processor 104 and a memory device 504 and, as an example of the computing device 500 performing its operations, the memory device 504 may include instructions 506-514 that are executable by the processor 104. The processor 104 may be synonymous with the processor found in common computing environments including but not limited to central processing units (CPUs). The memory device 504 can be said to store program instructions that, when executed by processor 104, implement the components of the computing device 500. The executable program instructions stored in the memory device 504 include, as an example, instructions to receive a remote wireless signal 506, instructions to interpret an indicator associated with the wireless signal 508, instruction to determine a physical relationship and orientation 510, instructions to represent the relationship in a configuration screen 512 and instructions to adjust a set of attributes 514.

Memory device 504 represents generally any number of memory components capable of storing instructions that can be executed by processor 104. Memory device 504 is non-transitory in the sense that it does not encompass a transitory signal but instead is made up of at least one memory component configured to store the relevant instructions. As a result, the memory device 504 may be a non-transitory computer-readable storage medium. Memory device 504 may be implemented in a single device or distributed across devices. Likewise, processor 104 represents any number of processors capable of executing instructions stored by memory device 504. Processor 104 may be integrated in a single device or distributed across devices. Further, memory device 504 may be fully or partially integrated in the same device as processor 104, or it may be separate but accessible to that device and processor 104.

In one example, the program instructions 506-514 can be part of an installation package that, when installed, can be executed by processor 104 to implement the components of the computing device 500. In this case, memory device 404 may be a portable medium such as a CD, DVD, or flash drive, or a memory maintained by a server from which the installation package can be downloaded and installed. In another example, the program instructions may be part of an application or applications already installed. Here, memory device 504 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

We claim:

1. A system comprising:
 a display, wherein the display comprises:
  a wireless sensor wherein the wireless sensor is configured to receive a remote wireless signal from a wireless emitter; and
  a communication channel wherein the communication channel is communicatively coupled to the wireless sensor; and
 a processor, wherein the processor is communicatively connected to the communication channel and is configured to:
  receive the remote wireless signal from the wireless sensor;
  determine a physical locational relationship and an orientation in three-dimensional space between the wireless sensor and the wireless emitter;
  logically represent the locational relationship and orientation in a configuration screen as a rendered image of a three-dimensional arrangement of the display; and
  adjust a set of attributes of the display based on the representation.

2. The system of claim 1 wherein the set of attributes comprises color calibration.

3. The system of claim 1 wherein the orientation comprises a delta tilt value, a delta turn value, and a delta distance value in relation to a reference point.

4. The system of claim 3 wherein the delta turn value comprises a coplanar turn value and a non-coplanar value.

5. The system of claim 1 wherein the wireless sensor comprises a near field communication sensor.

6. A method comprising:
 receiving a remote wireless signal from a wireless emitter at a wireless sensor;
 interpreting a signal level associated with the remote wireless signal;
 determining, based on the interpreting, a physical locational relationship and an orientation in three-dimensional space between the wireless sensor and the wireless emitter;
 representing the locational relationship and orientation logically in a configuration screen as a rendered image of a three-dimensional arrangement of a display; and adjusting a set of attributes of the display based on the representation.

7. The method of claim 6 wherein the set of attributes comprises color calibration.

8. The method of claim 6 wherein the orientation comprises a delta tilt value, a delta turn value, and a delta distance value in relation to a reference point.

9. The method of claim 8 wherein the delta turn value comprises a coplanar turn value and a non-coplanar value.

10. The method of claim 8 wherein the wireless sensor comprises a near field communication sensor.

11. A non-transitory computer readable medium comprising a memory having instructions stored thereon and a controller configured to perform, when executing the instructions to:

receive a remote wireless signal from a wireless emitter at a wireless sensor;

interpret an indicator associated with the remote wireless signal;

determine, based on the interpreting, a physical locational relationship and an orientation in three-dimensional space between the wireless sensor and the wireless emitter;

represent the locational relationship and orientation logically in a configuration screen as a rendered image of a three-dimensional arrangement of a display; and adjust a set of attributes of the display based on the representation.

12. The computer readable medium of claim 11, wherein the indicator comprises a unique identifier.

13. The computer readable medium of claim 11 wherein the set of attributes comprises color calibration.

14. The computer readable medium of claim 11 wherein the orientation comprises a delta tilt value, a delta turn value, and a delta distance value in relation to a reference point.

15. The computer readable medium of claim 14 wherein the delta turn value comprises a coplanar turn value and a non-coplanar value.

* * * * *